H. A. KING.
AUTOMATIC ROTARY ENGINE.
APPLICATION FILED JAN. 21, 1907.
953,206.
Patented Mar. 29, 1910.
4 SHEETS—SHEET 1.
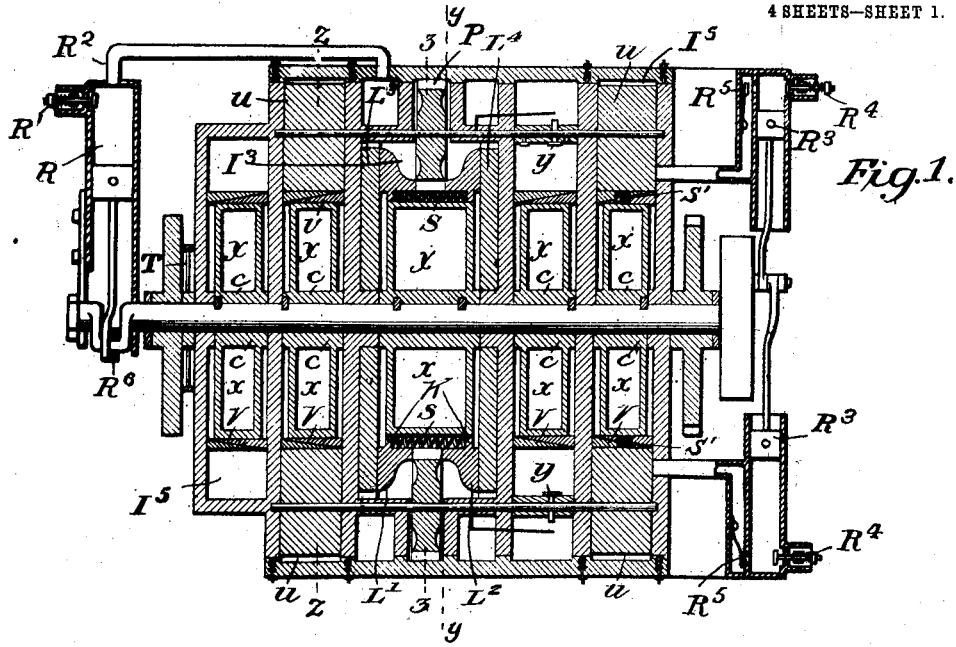
Fig. 1.
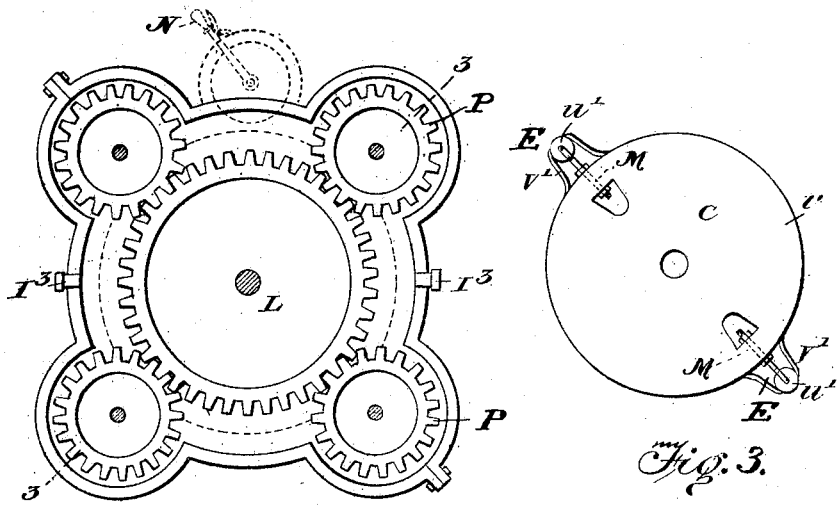
Fig. 2.
Fig. 3.
Witnesses:
W. L. Johnson
J. J. Andrews
Inventor:
Homer Arthur King.

H. A. KING.
AUTOMATIC ROTARY ENGINE.
APPLICATION FILED JAN. 21, 1907.

953,206.

Patented Mar. 29, 1910.
4 SHEETS—SHEET 2.

Witnesses:
A. Johnson
M. E. King

Inventor:
Homer Arthur King

H. A. KING.
AUTOMATIC ROTARY ENGINE.
APPLICATION FILED JAN. 21, 1907.
953,206.
Patented Mar. 29, 1910.
4 SHEETS—SHEET 3.
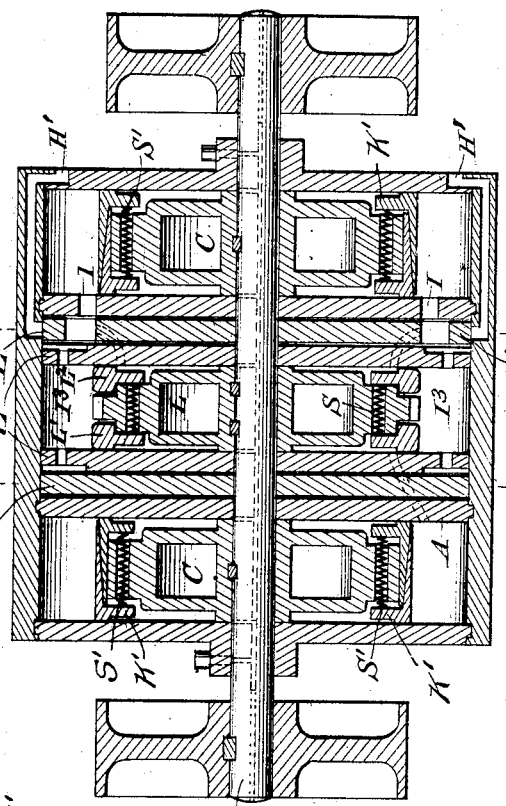
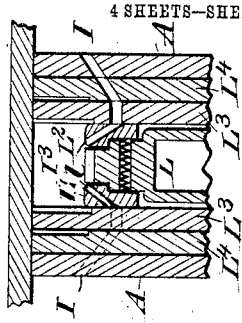
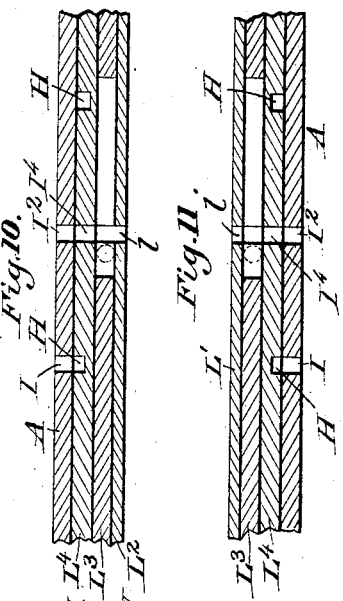
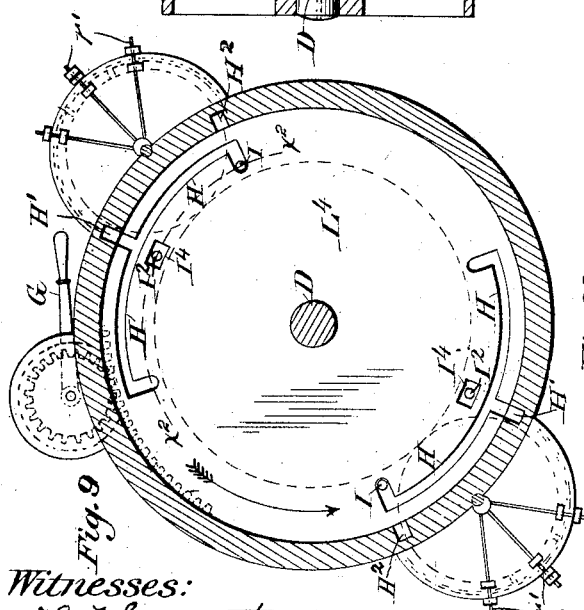
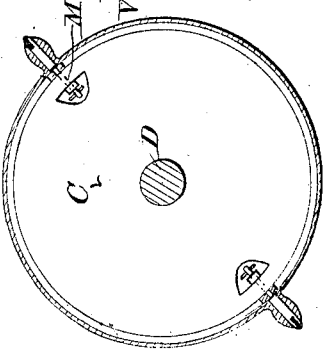
Witnesses:
H. F. Carpenter
M. E. King
Inventor:
Homer Arthur King

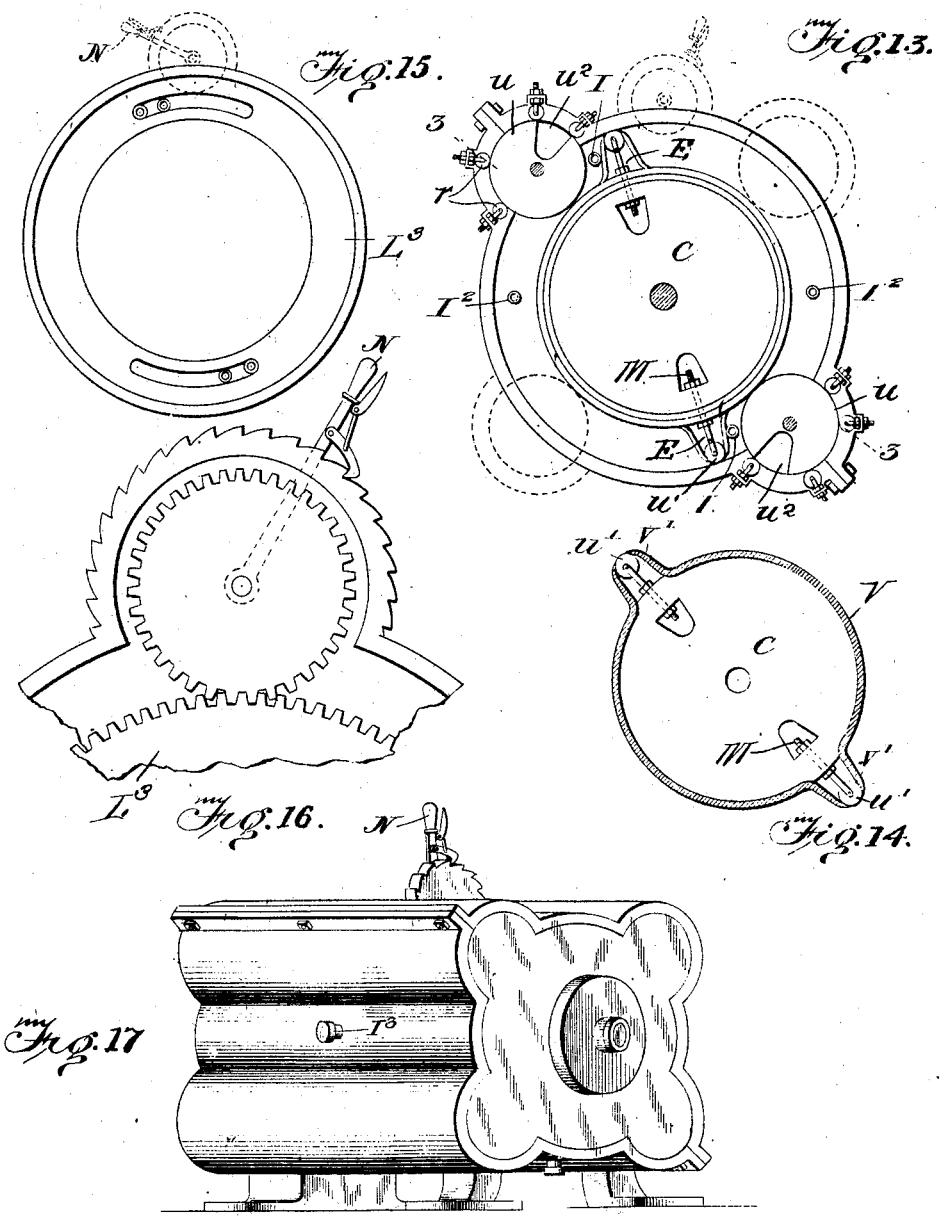

UNITED STATES PATENT OFFICE.

HOMER ARTHUR KING, OF COLTON, CALIFORNIA.

AUTOMATIC ROTARY ENGINE.

953,206.  Specification of Letters Patent. Patented Mar. 29, 1910.

Application filed January 21, 1907. Serial No. 353,569.

*To all whom it may concern:*

Be it known that I, HOMER ARTHUR KING, a citizen of the United States, residing at Colton, in the county of San Bernardino and State of California, have invented a new and useful Automatic Rotary Engine, of which the following is a specification.

My invention relates to improvements in automatic rotary engines, and the objects of my invention are, first, to provide an improved counter-pressure-balanced revolving cylinder-head with an easy means of access thereto; second, to provide a valve disk or carrier arranged to directly actuate one or more revoluble cylinder-heads; third, to provide a motive-fluid chest intermediate the annular cylinders of a rotary engine, with means for regulating the passage of the motive-fluid to said cylinders; fourth, to provide means for starting the engine when the piston-heads are at any point; fifth, to provide means for readily reversing the engine by interchanging the inlets and exhausts; sixth, to provide muffler engines on the engine shaft with means for conveying the exhaust motive-fluid from the engine cylinders thereto; seventh, to provide for an initial compression of the motive-fluid before it enters the motive-fluid chest of the engine; eighth, to provide improved means for packing the rotary parts. I attain these objects and others which will be apparent from the following description, by mechanism illustrated in the accompanying drawings, in which—

Figure 4:
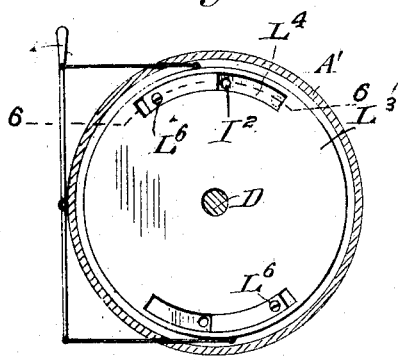
Figure 5:
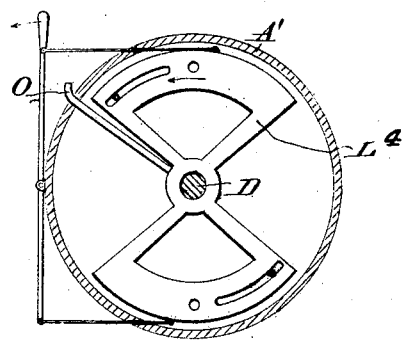
Figure 6:
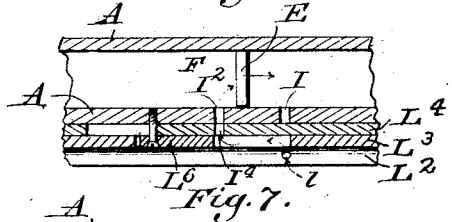
Figure 7:
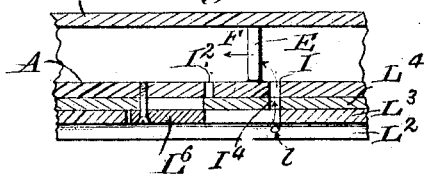

Figure 1 is a longitudinal section through my engine; Fig. 2 is a cross-section on the line $y$—$y$ of Fig. 1; Fig. 3 is a side elevation of one of the piston disks; Fig. 4 is a side elevation of the regulator or regulating disk, with the mechanism for changing its position; Fig. 5 is a side elevation of the reverser or reversing disk, together with the mechanism for changing its position; Figs. 6 and 7 are sectional views along the line 6—6 of Fig. 4, showing the position of the regulator and reverser when operating the engine in opposite directions; Fig. 8 is a longitudinal section showing my engine arranged without the mufflers and illustrating especially one manner of securing tight joints at the peripheries of the packing rings and valves; Fig. 9 is a cross-section on the lines 8—8 or 9—9 of Fig. 8, showing the motive-fluid passages through the reverser and their relation to the inlet and exhaust ports, together with the mechanism for changing the position of the reverser; Figs. 10 and 11 are cross-sectional views through the valves, regulators, and reversers on the line $x^2$—$x^2$ of Fig. 9, showing the relation of the fluid passages therein; Fig. 12 is a detail cross-section through the same parts and the valves and valve-carrier; Fig. 13 is a cross-section on the line Z—Z of Fig. 1; Fig. 14 is a cross-section through one of the piston-disks; Fig. 15 is a side-elevation of one of the regulators; Fig. 16 is a detail view of a portion of the regulator and showing the mechanism by which its position may be varied for starting the engine when the piston-heads are in different positions; Fig. 17 is a perspective view of the engine casing; and Fig. 18 is an elevation of a piston-disk showing a modified form of piston-head.

Referring to the drawings, my engine comprises a series of concentric cylinders or chambers, the central valve-chamber $I^3$, constituting the motive-fluid chest into which the compressed motive fluid is introduced. A valve-carrier or disk L, rotates within the valve-chamber $I^3$, having sprocket teeth upon its periphery which engage the pinions P, mounted in a recess in said valve chamber and secured to shafts which carry the rotary cylinder-heads or abutments $u$. The annular valve-rings L', $L^2$, are carried by the disk L upon either side of the sprocket teeth, and are pressed outwardly to form tight joints against the reversing disks $L^3$ by means of springs S, passing through apertures in the disk. The valves are provided with suitable apertures or passages to coöperate with the ports and fluid passages through the reversing disks.

Upon either side of the valve-chamber are the cylinders within which rotate the piston-disks C, provided with opposite piston-heads E, which may be solid or integral with the disk, as shown in Fig. 18, but are preferably formed as shown in Figs. 3 and 14, having a roller $u'$, bolted at M to the piston disk so as to be adjustable toward or from the periphery thereof, the packing-rings V being bent or sprung outwardly as shown at V' to form a housing for the roller and constitute the main portion of the piston-head. The packing-rings V surrounding the periphery of the piston-disks are preferably beveled as shown in Fig. 1, and are pressed outwardly by springs S'. I prefer to make the piston-disks hollow, as shown at $x$, and having their hubs splined to the engine shaft.

The revoluble abutments $u$ are provided with recesses $u^2$, as shown in Fig. 13, to receive and permit the piston-heads E to pass. In order that the abutments shall always fit snugly against the periphery of the piston-disk, I provide rollers $r$, bearing upon the periphery of the abutments and adjustably secured in the casing by means of the supporting bolts. As an alternative construction, I may arrange bolts $r'$, which bear against the arbor of the cylinder-heads as shown in Fig. 9. In this manner, I am enabled to take up any wear that may occur during the operation of the engine and insure close joints at all times.

The walls A, which separate the chambers or cylinders, are provided with ports I, $I^2$, which constitute inlet and exhaust ports. Between the walls A and the annular valve-rings $L'$, $L^2$, in the valve-chamber $I^3$, are the regulating disks $L^3$, and the reversing disks $L^4$. The regulating disks $L^3$ are illustrated in Figs. 4 and 15. These disks are provided with elongated slots which coöperate with the ports through the reversing disks to determine the length of time the motive-fluid shall enter the cylinder, and their position may be varied at will by means of the controller handle N, see Fig. 16. The reversing disks $L^4$ are illustrated in Fig. 9, and are provided with passages H and ports $I^4$. When the ports $I^4$ are brought into coincidence with the ports $I^2$, serving as inlets, the elongated passages H will then be in communication with ports I, serving as exhausts, and vice versa, as appears from an inspection of Fig. 9. In either position the passages H will be in communication with one or the other of the exhaust passages $H'$, $H^2$, leading through the casing wall. The position of the reversing disks may be changed to reverse the engine by means of the handle G. In Fig. 5, the reversing disk is shown as made of two sectors in skeleton form, and in the space between the sectors, a tube O is led to the shaft for the purpose of introducing lubricating oil.

The relation of the ports and passages in the valves, reversing and regulating disks, and in the walls of the cylinders will be apparent from the detail sectional view taken along the line $x^2$—$x^2$ of Fig. 9, as shown in Figs. 10 and 11; while the change in position of the regulating disk necessary to reverse the engine is shown in Figs. 6 and 7 taken on the line 6—6 of Fig. 4.

The operation of my engine will be apparent from the foregoing description. The motive-fluid is drawn in through a supply through valve $R'$ and compressed and forced by the compression pump R through the pipe $R^2$ into the valve-chamber $I^3$, whence it passes through the openings in the valve-rings $L'$, $L^2$, the elongated passages in the regulating disks $L^3$, the apertures $I^4$ in the reversing disks $L^4$, and the ports I or $I^2$ in the cylinder walls into the cylinders upon either side of the valve-chamber, and is exploded at the proper instant by the contact of the piston-heads with the spark-plug contacts conventionally illustrated at $y$. When my machine is operated as a compound engine, as shown in Fig. 1, the exhaust gases flow through the passages $H'$ or $H^2$, into the expansion chambers $I^5$, upon either side of the main cylinders; but when the engine is not provided with expansion chambers, as illustrated in Fig. 8, the exhaust gases immediately discharge through the exhaust passages $H'$, $H^2$.

In order that the cylinder may be cleansed after each impulse, I provide pump or compressor cylinders for alternately forcing air thereinto, as illustrated on the right of Fig. 1. The air is drawn in through valves $R^4$, and after being compressed by the reciprocating pistons $R^3$, is forced through valves $R^5$ leading into the cylinders.

It will be evident to engineers and others skilled in this art, that various changes may be made in the arrangement of parts without departing from the spirit of my invention.

Having now described my invention and the manner of operation thereof, I claim—

1. In a rotary engine, the combination with a casing having a plurality of cylindrical piston chambers, of a piston disk or carrier revoluble in each chamber and having a plurality of piston-heads projecting radially therefrom, abutments revolubly mounted within said casing and provided with recesses or cavities to receive the piston-heads, an intermediate valve chamber having a valve-carrier revoluble therein, and provided with peripheral teeth, gear wheels mounted in recesses in said valve chamber arranged to engage said peripheral teeth and connected with said revoluble abutments, and annular ring valves carried upon the periphery of said carrier upon either side of said peripheral teeth.

2. In a rotary engine, the combination with a casing having a cylindrical piston chamber, of a piston disk or carrier revoluble therein and having a plurality of piston-heads projecting radially therefrom, abutments revolubly mounted within said casing and provided with recesses or cavities to receive the piston-heads, means for operating the piston disks and abutments synchronously, a plurality of rollers arranged to bear against the periphery of the abutments, and means for independently adjusting the pressure of said rollers.

3. In a rotary engine, the combination with a casing having a cylindrical piston chamber, of a piston disk or carrier revoluble therein and having a plurality of piston-heads projecting radially therefrom, abutments revolubly mounted within said casing and provided with recesses or cavities to receive the piston-heads, means for operating the piston disk and abutments synchronously, and a plurality of rollers arranged to bear against the periphery of the abutments.

4. In a rotary engine, the combination with an annular cylinder, a disk carrying piston-heads revolubly mounted therein, abutments revolubly mounted within the casing, an annular motive-fluid chest concentric with said cylinder, a separating wall common to said cylinder and chest having inlet and outlet ports, a valve disk provided with peripheral teeth and revolubly mounted in said motive-fluid chest and carrying upon its periphery annular ring valves co-operating with said inlet and outlet valves, gear wheels meshing with said peripheral teeth and connected with said abutments.

5. In a rotary engine, the combination with an annular cylinder, a disk carrying piston-heads revolubly mounted therein, an annular motive-fluid chest concentric with said cylinder, abutments revolubly mounted in the casing, a separating wall common to said cylinder and chest having inlet and outlet ports, a valve disk provided with peripheral teeth and revolubly mounted in said motive-fluid chest and carrying upon its periphery annular ring valves provided with openings therethrough, gear wheels meshing with said peripheral teeth and connected with said abutments, and reversing and regulating disks adjustably mounted between said valve rings and said wall and each of said disks having passages adapted to be brought into juxtaposition with said ports and said openings.

6. A rotary engine comprising a substantially cylindrical casing, an annular motive-fluid chest, a disk revolubly mounted therein having peripheral teeth and carrying upon its periphery upon either side of said teeth valve rings having valve openings therethrough, cylinders concentrically mounted upon either side of said motive-fluid chest, a piston-disk and revoluble abutments revolubly mounted in said cylinder, gear wheels meshing with said teeth and connecting with said abutments, and inlet ports between said cylinders and said chest arranged alternately and symmetrically, whereby said valve openings may alternately connect said cylinders with the motive-fluid chest.

7. A rotary engine comprising a substantially cylindrical casing, an annular motive-fluid chest, a disk revolubly mounted therein having peripheral teeth and carrying upon its periphery upon either side of said teeth valve rings having valve openings therethrough, cylinders concentrically mounted upon either side of said motive-fluid chest, a piston-disk and revoluble abutments revolubly mounted in said cylinder, gear wheels meshing with said teeth and connecting with said abutments, inlet ports between said cylinders and said chest arranged alternately and symmetrically, whereby said valve openings may alternately connect said cylinders with the motive-fluid chest, and means connected with the engine shaft for causing an initial compression of the motive-fluid in the chest.

8. A rotary engine comprising a substantially cylindrical casing, an annular motive-fluid chest, a disk revolubly mounted therein and carrying upon its periphery valve rings having valve openings therethrough, cylinders concentrically mounted upon either side of said motive-fluid chest, inlet ports between said cylinders and said chest arranged alternately and symmetrically, whereby said valve openings may alternately connect said cylinders with the motive-fluid chest, means connected with the engine shaft for causing an initial compression of the motive fluid in the chest, and means connected with the engine shaft for compressing and forcing air into the cylinders alternately to scavenge the same of the spent gases.

In testimony whereof I have signed my name to this specification in the presence of two subscribing witnesses.

HOMER ARTHUR KING.

Witnesses:
W. L. ZACLER,
M. E. KING.